(12) United States Patent
Balz et al.

(10) Patent No.: US 6,702,405 B1
(45) Date of Patent: Mar. 9, 2004

(54) ELECTRIC PARKING BRAKE

(75) Inventors: Jürgen Balz, Hünstetten-Oberlibbach (DE); Alfred Eckert, Mainz-Hechtsheim (DE); Bernhard Kant, Hochheim (DE); Peter Skotzek, Frankfurt am Main (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/647,268

(22) PCT Filed: Mar. 26, 1999

(86) PCT No.: PCT/EP99/02096
§ 371 (c)(1),
(2), (4) Date: Jan. 2, 2001

(87) PCT Pub. No.: WO99/50112
PCT Pub. Date: Oct. 7, 1999

(30) Foreign Application Priority Data

Mar. 31, 1998 (DE) .......................................... 198 14 305
Aug. 27, 1998 (DE) .......................................... 198 38 886

(51) Int. Cl.⁷ ................................................. B60T 8/32
(52) U.S. Cl. ........................................ 303/192; 303/20
(58) Field of Search ....................... 303/122.04, 122.05, 303/20, 3, 15, 192, 191

(56) References Cited

U.S. PATENT DOCUMENTS

| | | | | |
|---|---|---|---|---|
| 4,561,527 A | * | 12/1985 | Nakamoto et al. | 192/4 C |
| 4,629,043 A | | 12/1986 | Matsuo et al. | |
| 4,892,014 A | * | 1/1990 | Morell et al. | 74/866 |
| 5,166,881 A | * | 11/1992 | Akasu | 364/426.04 |
| 5,667,282 A | * | 9/1997 | Kim | 303/3 |
| 5,675,190 A | * | 10/1997 | Morita | 307/10.1 |
| 5,919,112 A | * | 7/1999 | Michael et al. | 477/99 |
| 5,957,246 A | * | 9/1999 | Suzuki | 188/72.1 |

FOREIGN PATENT DOCUMENTS

| | | |
|---|---|---|
| DE | 41 29 919 | 3/1993 |
| WO | 90 15 743 | 12/1990 |
| WO | 98 40 255 | 9/1998 |

OTHER PUBLICATIONS

ATZ—Automobiltechnische Zeitschrift, vol. 91, Ed. 11, p. 622 (1989).

* cited by examiner

Primary Examiner—Jack Lavinder
Assistant Examiner—Xuan Lan Nguyen
(74) Attorney, Agent, or Firm—Rader, Fishman & Grauer PLLC

(57) ABSTRACT

An electric parking brake system for a vehicle includes an electric control unit that controls a brake device and an operating element for actuating the electric parking brake system. When the vehicle is in a resting position, actuation of the operating element alternatively applies and releases the electric parking brake according to the driver's request. The electric parking brake system includes a parking operative mode and several starting operative modes. The electric parking brake system includes at least one distance sensor for enabling a controlled power braking involving dynamics and slip control when the vehicle is moving to avoid a potential collision with an obstacle, especially when parking the vehicle.

9 Claims, 3 Drawing Sheets

ELECTRIC PARKING BRAKE

TECHNICAL FIELD

The present invention generally relates to parking brakes and more particularly relates to an electric parking brake system for a vehicle with an electronic control device controlling a wheel brake device and an operating element for actuating the electric parking brake system.

BACKGROUND OF THE INVENTION

An electric parking brake system of the general type shown herein has already been disclosed in DE 41 29 919 A1. This publication describes a parking brake in the form of a power-brake system, in which the brake is actuated by an electric motor, with an electronic controller being electrically connected to sensors detecting the operating state of the vehicle. The electronic controller controls the brake-applying and releasing operations of the wheel brakes subject to signals coming from a brake-applying device and/or the sensors.

It has to be mentioned, that the provisions of ECE R 13.09 5.2.1.26.2 which apply to permits as of Feb. 22, 1997, require that electric parking brake systems (EPB) with an electric transmission device must be operable from the driver's seat in case of an electric error, thus achieving a predefined locking effect. This locking effect relates to the static test on an inclined plane with a gradient of 18%. In the vehicle classes M1 and N1 resulting from the above-mentioned provisions, the effect of the transmission brake may also be used. Furthermore the EPB complying with the provisions mentioned above has to be released by devices carried in the vehicle.

It is the object of the present invention to avoid the disadvantages of the prior art and to create an electric parking brake system with expanded functionality, higher safety and improved comfort. In particular, the present invention shall provide a parking brake system enabling a controlled power braking, especially during travel, with high dynamics and involving slip-control processes.

The object according to the present invention is achieved in that an actuation of the operating element alternatively applies and releases the electric parking brake according to the driver's request, if the vehicle is in a resting position.

According to one preferred embodiment of this invention, the actuation of the operating element applies the electric parking brake as long as said element is actuated, if the vehicle is travelling. Thus, a controlled braking can be executed in consideration of the current driving situation.

For reasons of safety, it is desirable that the electric parking brake according to the invention is provided with at least one sensor detecting the blocking of a wheel and consequently feeding a signal to the electric control unit. In order to avoid an uncontrolled driving condition, the electric control unit releases a brake application on the wheel as a reaction to the signal of at least one sensor.

An improvement of the present invention includes a parking operative mode of the parking brake system according to the present invention, in which, for reasons of comfort, the control unit automatically locks the electric parking brake system if the vehicle is parked.

A comfortable and safe further development of the present invention includes a first starting operative mode of the electric parking brake system according to the present invention, in which the electric control unit automatically releases the electric parking brake when starting the parked vehicle.

According to another development of the present invention, a second starting operative mode of the electric parking brake system according to the present invention is foreseen in which the electric control unit applies the parking brake system before starting the vehicle, if an operating element is actuated, releasing the brake during the starting process by means of suitable dynamics.

Advantageously, a third starting operative mode is foreseen, in which the electric control unit applies the electric parking brake system independently before starting the vehicle releasing it during the starting process. Thus it is avoided that the vehicle rolls away against the starting direction, wherein the desired starting direction can be determined e.g. by the selection of the speed (Hillholder).

Preferably, the electric parking brake includes at least one sensor detecting the angle of inclination of the vehicle and thus delivering a signal to the electronic control unit. In such a way the parking brake system can cause or support a braking process on the basis of an inclination without the driver having to initiate a separate braking process.

Just when parking in the vehicle, the driver has to execute a lot of activities. Therefore one way of parking in, in which the electronic control unit automatically actuates the electric parking brake system during the parking-in process, results in a particularly safe and comfortable operation of the parking brake system according to the present invention.

Advantageously, the parking brake system according to the present invention includes at least one distance sensor determining the distance between the vehicle and an obstacle, especially another vehicle, and delivering a signal to the electric control unit as a reaction to this. In such a way, the parking brake system according to the present invention can avoid a collision with the obstacle, especially when the vehicle is parked in.

DETAILED DESCRIPTION OF THE PREFERRED EMBODIMENTS

Figure 1:
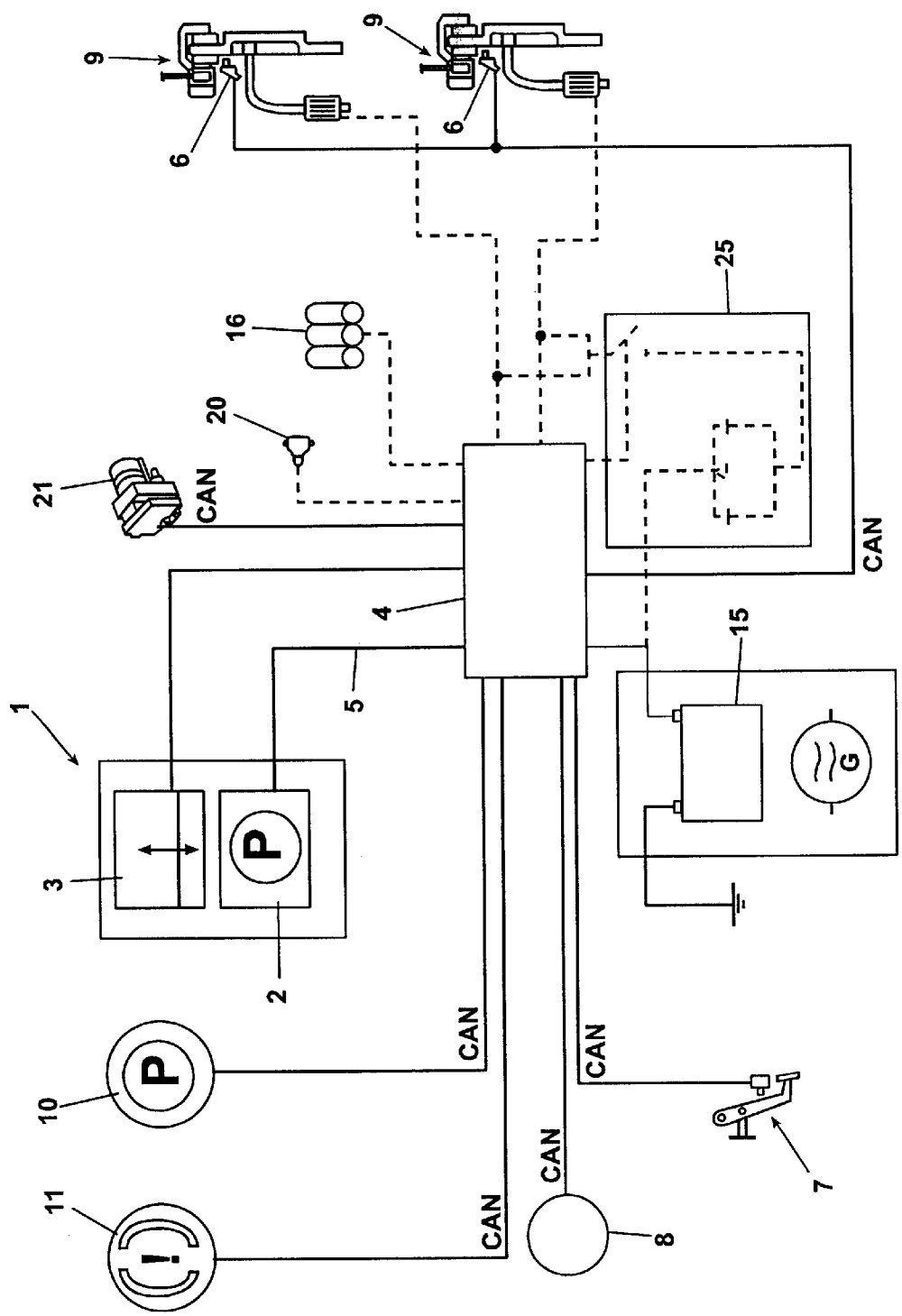
FIG. 1 is a schematic diagram indicating the structure of the electric parking brake system according to the present invention.

FIG. 1 schematically represents the concept of an electric parking brake system (EPB) according to the present invention. A pushbutton 1 serves as operating element for the electric parking brake system. The pushbutton 1 includes a single-state button 2 which can be operated by the driver and distinguishes only between the states "actuated" and "not actuated". Analogously the pushbutton 1 can also be a dual-state button or rocker switch 2 distinguishing the states "zero position" (i.e. resting position), "actuate" and "release" and enabling a control of the wheel braking device, if requested by the driver. In addition to this, the operating element preferably includes a permanent status indication 3, executed in particular as a red flag. The pushbutton 1 serves for registering the driver's request and acknowledging the condition. The basic function of the parking brake system according to the present invention is actuating or releasing the parking brake when the vehicle stands still by operating pushbutton 1. This means applying and releasing the electric parking brake system (on/off function) with regard to a predefined time and maximum force. In addition to this basic function there is the operation of pushbutton 1 during travel. As long as pushbutton 1 is pressed, the application force is increased along a predetermined ramp and released by means of a predetermined function of time. For reasons of safety (redundancy principle) the electric parking brake system according to the present invention may include another pushbutton (not shown). By means of a line 5 pushbutton 1 is connected to a control unit 4, which can be designated also as EPB ECU (ECU=electronic control unit). The information on the operative condition of the pushbutton 1 is transmitted to the control unit 4 via the line 5. In addition to realizing a control strategy for controlling the electric parking brake system, the fundamental task of the control unit 4 consists in converting the driver's request signalized by pushbutton 1 into the relative control signals being the nominal values for the control of the electric parking brake system. The control unit 4 includes an electronic controlling device with alarm function, especially for controlling the application force and detecting the wear of the brake linings, as well as with diagnostic means and a safety logic. Wheel speed sensors 6 are connected to the controller 4 by means of a Controller Area Network (CAN) bus. The control unit 4 determines the vehicle speed on the basis of the wheel speed detected by the wheel speed sensors 6. The CAN bus transmits the present actuation status of the service brake 7 (brake light switch) to control unit 4.

On the basis of the information on the vehicle speed and the operating status of the service brake system, the electric parking brake system is operated according to the driving situation which is an advantage for reasons of the driving comfort of a braking process by the EPB and the driving stability during a braking process by the EPB. In order to make sure that the wheel brakes 9 cannot be unintentionally released when the ignition device 8 is switched off, which e.g. is a child-proof feature, the wheel brakes being preferably a cup-type dual power brake or a combined caliper brake, the operating status of the ignition device 8 via the CAN bus is at the same time an input signal for the control unit 4. If the ignition device 8 delivers a signal to control unit 4 indicating that the ignition device 8 is switched off, the wheel brakes 9 can only be applied. It has to be mentioned that the wheel brakes 9 are controlled by two self-locking electric motor/transmission units in order to achieve the parking brake effect. Thus the parking brake system according to the present invention achieves the well-known functionality of a conventional mechanical parking brake by electromechanical means, the braking parts of the electric parking brake system being kept in the braking position only by mechanical self-locking. The control unit 4 via the CAN bus controls a control lamp 10 indicating whether the electric parking brake is applied or not. In addition to this the control unit 4 via the CAN bus controls a warning lamp 11 indicating an error or an operational failure of the electric parking brake system.

A vehicle battery 15 is foreseen for the power supply of the control unit 4. Furthermore the electric parking brake system preferably includes an emergency battery 16, being provided in particular a battery pack. The emergency battery 16 ensures a bypass of the vehicle battery 15 for at least one application operation by means of the pushbutton 1. If due to the failure of the vehicle battery 15 it cannot be recognized that the ignition device 8 has been switched on, e.g. in case of a failure of the CAN bus, or if no ignition signal is given, this leads to a single application operation via the emergency battery 16 achieving thus a "child-proof" feature. Alternatively the emergency battery 16 can also enable the release of the parking brake by means of said emergency battery 16, if the electric system of the vehicle fails. In this case it is necessary, however, that the emergency battery is powerful enough to enable another application after having released the parking brake so that a reliable parking of the vehicle is guaranteed. In particular the parking brake system according to the present invention like a mechanical parking brake is provided in such a way that the parking brake system can also of be applied, if the ignition device 8 is switched off. For this reason it is necessary that the control unit 4 or the electric control unit is triggered and the driver is informed about the status of the application process by means of a permanent status indicator lamp (not shown), since the control lamp 10 and the warning lamp 11 as well as possible additional indicator lamps in the center console are not permanently visible.

Thus, the electric parking brake system according to the present invention guarantees that the driver receives information about a brake-applying or releasing operation which has been executed or not, and about the current actuation status (not actuated, partly actuated or completely actuated) of the brake system, even if the ignition device 8 is deactivated and the vehicle battery is empty or removed. A gradient sensor 20 is integrated in the electronic of the control unit 4 delivering a signal to the control unit 4 which corresponds to the gradient of the vehicle. The gradient sensor 20 is preferred in particular for achieving the functionality of an active starting aid. By means of the CAN bus, an interface for the external control and communication, e.g. by and/or with a hydraulic slip-controlled brake system 21 or a power controlled, active service brake 21, is foreseen.

Vehicles with gear box preferably are provided with an emergency actuating device 25 guaranteeing that the vehicle in case of a gradient of e.g. 18% can be stopped even if the electric parking brake system fails. For this reason, the emergency actuating unit 25 includes a separate operating element which may be integrated in the pushbutton 1 or arranged in a concealed manner in a suitable position in the interior of the vehicle(being operable from the driver's seat). In case of a defect in the control unit 4 or in pushbutton 1, the emergency actuating device 25 is released and can be used for applying the actuators of the electric parking brake.

Figure 2:
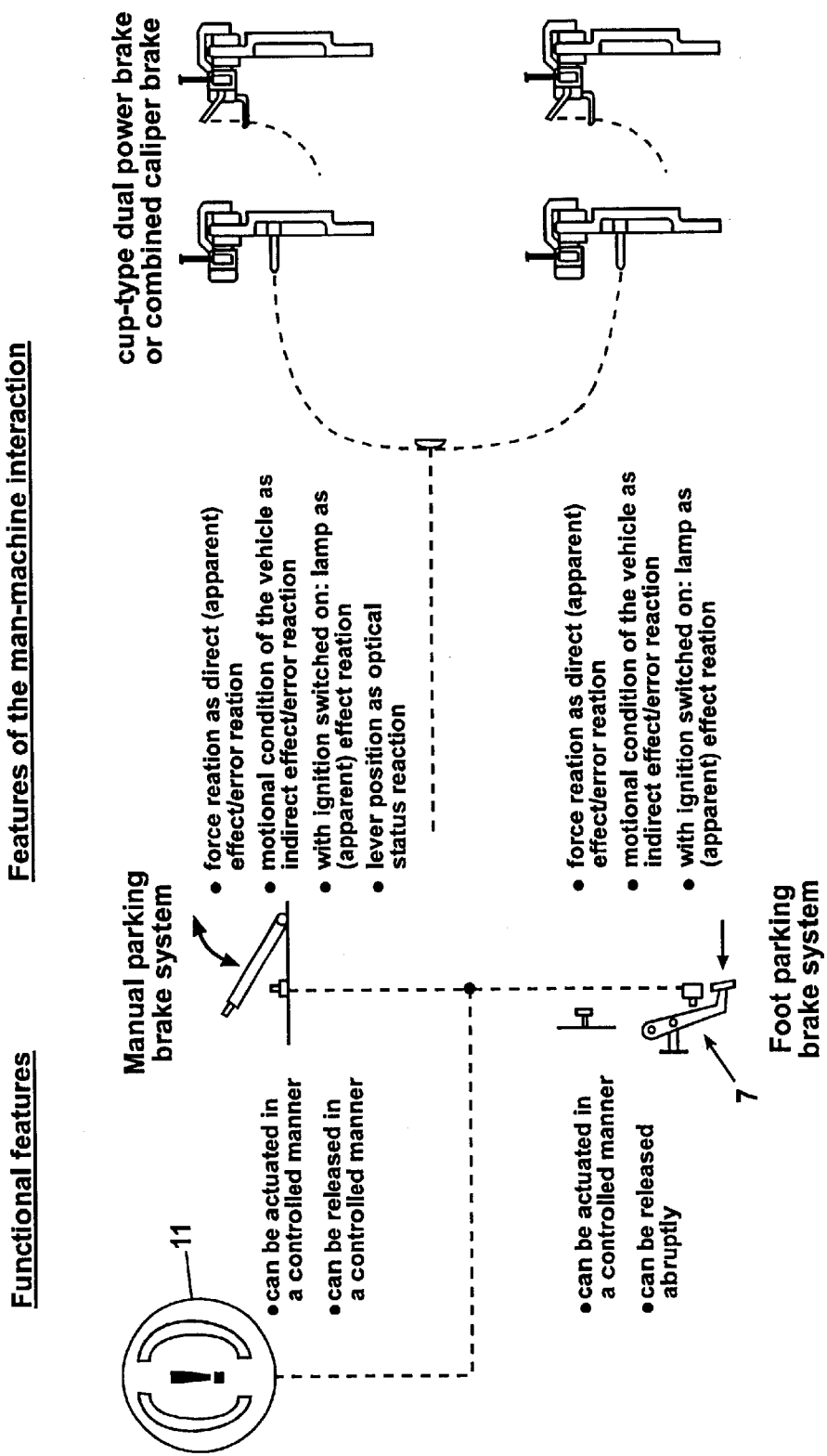
FIG. 2 is a schematic outline representing the functional features of the electric parking brake system according to the present invention with regard to the man-machine interaction.

FIG. 2 shows a schematic outline representing the man-machine interaction (MMI) of a parking brake system actuated by hand or by foot as far as the feedback of status, effect and error is concerned. Both brake systems have in common that they can be actuated in a controlled manner. Contrary to a manual parking brake system which can also be released in a controlled manner, a parking brake system actuated by foot can only be released abruptly. A parking brake system actuated conventionally by hand with a lever has an optical status feedback due to the lever position. Both types of brake systems have a direct or apparent effect or error reaction by means of the force reaction. Furthermore the motional condition of the vehicle represents an indirect effect or error reaction. Finally the control lamp 10 indicates an apparent effect reaction if the ignition device 8 is switched on.

Figure 3:
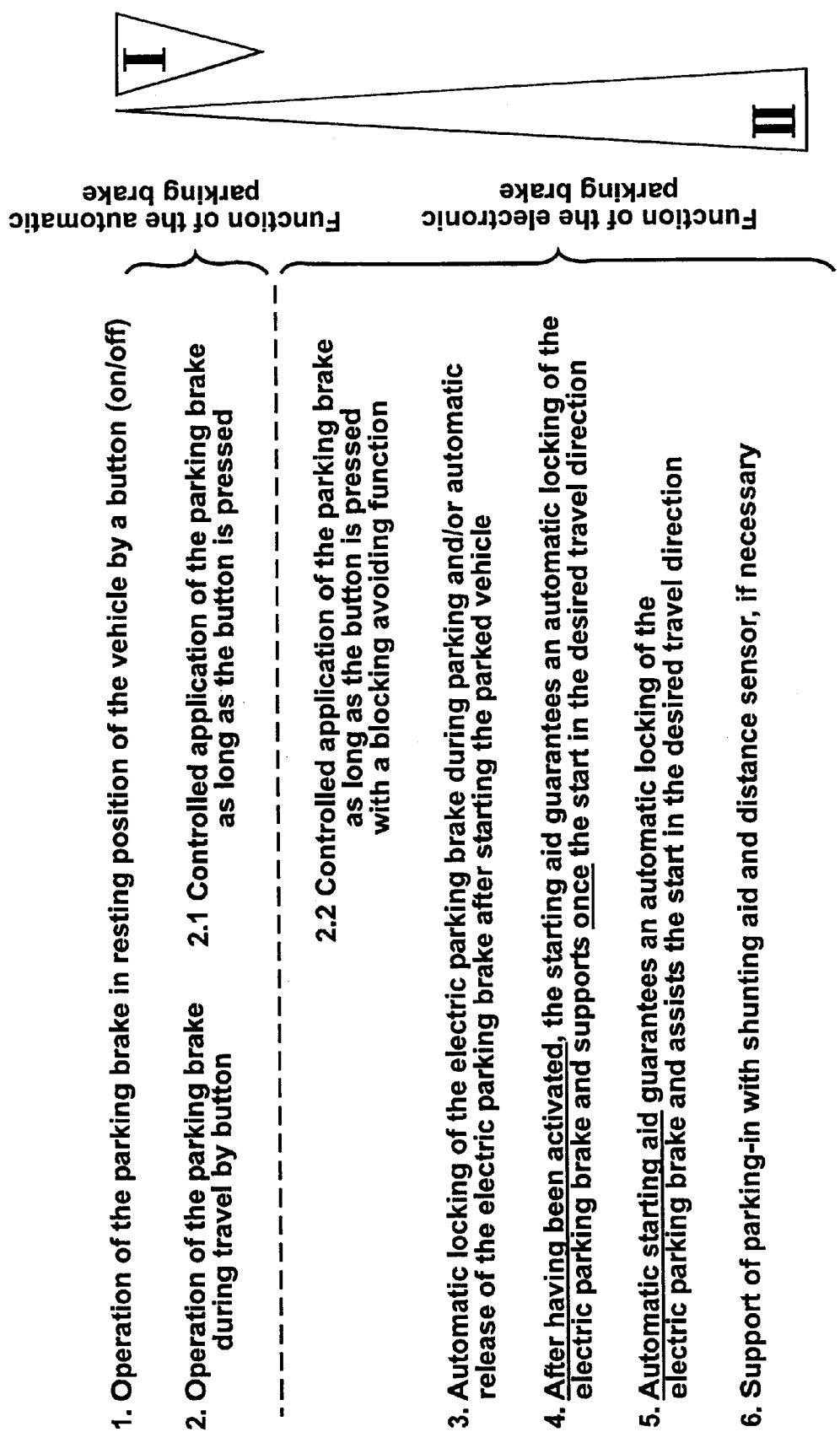
FIG. 3 is a schematic outline representing the functional features of an electric parking brake system according to the present invention.

Finally, FIG. 3 schematically represents in a summary the transition from the basic function of the electric parking brake to the electric parking brake system according to the invention with expanded functionality which also can be designated as active parking brake system (APB).

What is claimed is:

1. Electric parking brake system for a motor vehicle with an electric control unit for controlling at least one wheel brake by means of a self-locking electric motor/transmission unit in order to achieve a parking brake effect, with an operating element for actuating the electric parking brake system, and with at least one sensor connected to the control unit, wherein upon actuation of the operating element while the vehicle is at rest, the parking brake system is applied with maximum force according to a driver's request, to fully engage the brake and hold the vehicle at rest and wherein upon actuation of the operating element while the vehicle is moving, the parking brake system is applied with a controllable application to ramp up the force as long as the operating element is actuated to slow the vehicle in a controlled manner, the parking brake system being released after a predetermined period of time or by the at least one sensor detecting the locking of a wheel and consequently delivering a signal to the electric control unit.

2. Electric parking brake system according to claim 1, wherein the electric parking brake system is alternatingly applied or released in the resting position of the motor vehicle and on consecutive actuations of the operating element according to the driver's request.

3. Electric parking brake system according to claim 1, including a parking operating mode in which the control unit automatically blocks the electric parking brake during parking.

4. Electric parking brake system according to claim 1, further including a first starting operating mode, in which the electric control unit automatically releases the electric parking brake system when starting the parked vehicle.

5. Electric parking brake system according to claim 4, further including a second starting operating mode in which the electric control unit applies the parking brake system before starting and releases the parking brake system during the starting operation when the operating element is actuated.

6. Electric parking brake system according to claim 5, further including a third starting operating mode, in which the electric control unit automatically applies the electric parking brake system before starting the vehicle, and releasing the brake during the start.

7. Electric parking brake system according to claim 1, further including at least one gradient sensor for detecting the inclination of the vehicle and consequently delivering a signal to the electric control unit.

8. Electric parking brake system according to claim 1, further including a parking-in operating mode in which the electronic control unit automatically applies the electric parking brake when parking the vehicle.

9. Electric parking brake system according to claim 1, further including at least one distance sensor for determining a distance between the motor vehicle and an obstacle, and consequently delivering a signal to the electric control unit.

* * * * *

UNITED STATES PATENT AND TRADEMARK OFFICE
CERTIFICATE OF CORRECTION

PATENT NO.   : 6,702,405 B1
DATED         : March 9, 2004
INVENTOR(S)  : Jurgen Balz et al.

It is certified that error appears in the above-identified patent and that said Letters Patent is hereby corrected as shown below:

<u>Column 5,</u>
Line 25, please change "including a parking" to -- further including a parking --.

Signed and Sealed this

First Day of June, 2004

JON W. DUDAS
*Acting Director of the United States Patent and Trademark Office*